United States Patent Office 3,138,430
Patented June 23, 1964

3,138,430
FORMAMIDE, UREA OR THIOUREAS PRETREATMENT OF DELUSTERED CELLULOSE DYED WITH A UREA-REACTIVE DYE MIXTURE
Hans Rafael, Weil am Rhein, and Siegfried Bode, Grenzach, Germany, assignors to J. R. Geigy A.-G., Basel, Switzerland
No Drawing. Filed Apr. 21, 1961, Ser. No. 104,545
Claims priority, application Switzerland Apr. 23, 1960
1 Claim. (Cl. 8—62)

The present invention concerns a process for the attainment of deep and level prints with reactive dyestuffs on delustered regenerated cellulose material as well as, as industrial product, the regenerated cellulose materials printed according to this process.

If delustered regenerated cellulose is printed with a printing paste containing a reactive dyestuff, then prints are obtained which, depending on the dyestuff, to a greater or lesser extent are less strongly coloured and less even than on cotton.

Now, the addition to the printing paste of nitrogen-containing compounds or salts of same in amounts of up to about 20% calculated on the total weight thereof, has already been recommended for the printing of cotton to attain prints of greater colour strength. Thus the content of the nitrogen-containing compound of the printing paste has been increased in order to also obtain prints of like colour strength on delustered regenerated cellulose as on cotton. Although a deeper colour strength is thereby attained, the evenness of the prints is not always up to requirements.

It has now been found that deep and level prints can be attained on delustered regenerated cellulose material if the material is impregnated according to the conventional methods in the art, before printing with the reactive dyestuffs, with compounds of the general Formula I

In Formula I,

X represents the thio group or imino group, preferably however, the oxo group,
R represents preferably the primary amino group, if desired also a secondary or tertiary amino group, a low alkoxy group such as, e.g. the methoxy or ethoxy group, or an aliphatic radical containing up to 4 carbon atoms such as, e.g. the methyl, ethyl, propyl or butyl radical, or an acid amide radical, e.g. the $CH_2CONH_2$ radical.

If the compound of the general Formula I is guanidine, then it can also be used in the form of its salts, for example, as carbonate.

A preferred compound specific to general Formula I is one of the subgeneric formula

wherein X represents =S or =NH or, preferably, =O, and R' represents —$NH_2$, —$NHCH_3$ or —$CH_3$ with the limitation that when X is =S or =NH, R' must be —$NH_2$. Guanidine as employed in this invention can be used in the form of its salt, e.g. guanidine carbonate. Urea, thiourea and guanidine carbonate have been found to be particularly preferred.

By "reactive dyestuffs" are meant those dyestuffs which enter into a chemical linkage with polyhydroxylated textile materials and, for this purpose, are fixed, if desired at a raised temperature, with acid binding agents having an alkaline reaction such as sodium or potassium carbonate, sodium or potassium hydroxide, sodium or potassium bicarbonate, di- or tri-sodium phosphate, tetrasodium pyrophosphate or sodium metasilicate. The reactive dyestuffs can belong to the most various classes of dyestuffs, for examples of the nitro, azo, anthraquinone, phthalocyanine or formazyl series. They can also contain heavy metal in complex linkage. The reactive groups of these dyestuffs can be any substituents which, at temperatures usual in dyeing and printing processes for reactive dyestuffs, react with alkalies while splitting off as anion. The reactive substituent can be, for example, the radical of a β-halogen fatty acid or the radical of a cyclic carbimide halide which contains at least one halogen atom at a ring carbon atom adjacent to a tertiary ring nitrogen atom. In particular this substituent can be an azine ring of aromatic character containing at least two tertiary ring nitrogen atoms and at least one halogen such as, e.g. chlorine or bromine, at carbon atoms adjacent thereto, that is, for example, a mono-, di or tri-halogen diazinyl radical or a mono- or di-halogen triazinyl radical.

Advantageously an aqueous, about 10% solution of compounds of the general Formula I is used to impregnate the regenerated cellulose material.

Regenerated cellulose, impregnate according to the invention with compounds of the general Formula I, is then printed according to methods recognised in the art, with reactive dyestuffs advantageously in the presence of acid binding agents such as, e.g. sodium carbonate and the printing, if desired, is performed at a higher temperature.

The process according to the invention improves the evenness of the prints on delustered regenerated cellulose material. Quite apart from this, it has the advantage that by pad dyeing with compounds of the Formula I, it is possible to improve the dye affinity of delustered regenerated cellulose material, so that, for example, cotton and delustered regenerated cellulose material can be printed in practically the same colour strengths and level shades simultaneously or successively with the same printing paste containing reactive dyestuffs, whereas up to now it has been necessary with every change from cotton printing to the printing of delustered regenerated cellulose and vice versa, to also change the printing paste, which naturally entails waste of time and additional energy.

Further details can be seen from the following examples which serve to illustrate the invention. Where not otherwise expressly stated, parts are given as parts by weight. Their relationship to parts by volume is as that of grammes to cubic centimetres. The temperatures are in degrees centigrade.

In the structural formulae in the examples, dyestuffs having di- and tri-chloropyrimidylamino groups are shown as containing 4,6-di- or 4,5,6-tri-chloro-2-pyrimidyl radicals. Actually, however, these dyestuffs are isomeric mixtures containing chiefly 2,6-di- or 2,5,6-tri-chloropyrimidyl-4 groups and 4,6-di- or 4,5,6-trichloropyrimidyl-2 groups and the formulae shown should be so interpreted.

EXAMPLE 1

Delustered viscose is impregnated with an aqueous solution which contains 100 parts of urea per 1000 parts. The goods are squeezed out to an increase in weight of 100% and dried at 80 to 100°. The pre-treated material is then printed by one of the usual methods with the following printing paste: 40 parts of the dyestuff of the formula

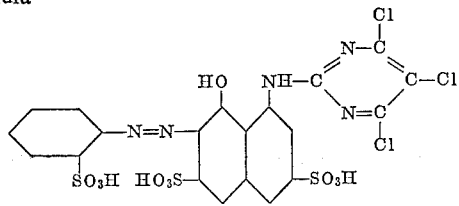

- 100 parts of urea
- 200 parts of water
- 10 parts of the sodium salt of 3-nitrobenzene sulphonic acid
- 620 parts of sodium alginate (5% aqueous solution)
- 30 parts of sodium carbonate 1000 parts of printing paste The textile is then dried and afterward steamed for 7–10 minutes or subjected to dry heat of 150–180° for 4–6 minutes. The goods so treated are rinsed first cold, then hot and then soaped at the boil for 30 minutes with a solution of 2 parts of Marseilles soap in 1000 parts of water. A deep, level, red print is obtained.

Under otherwise the same conditions but without pretreating the textile with urea, weaker and uneven prints are obtained.

A similar result is attained if the fabric is pretreated with thiourea, guanidine carbonate, acetamide or methyl urea instead of urea.

Deep, level prints are also obtained if, under otherwise the same conditions, one of the dyestuffs given in the following table is used.

*Table 1*

| No. | Dyestuff | Shade on cellulose fibres |
|---|---|---|
| 1 | | Brilliant red. |
| 2 | | Red. |
| 3 | | Brilliant red. |
| 4 | | Do. |
| 5 | | Red. |
| 6 | | Reddish yellow. |

*Table 1*—Continued

| No. | Dyestuff | Shade on cellulose fibres |
|---|---|---|
| 7 | (structure) | Reddish-yellow. |
| 8 | (structure) | Scarlet. |
| 9 | (structure) | Do. |
| 10 | (structure) | Orange. |
| 11 | (structure) | Yellow. |
| 12 | (structure) | Do. |
| 13 | (structure) | Brown. |
| 14 | (structure) | Orange-brown. |

EXAMPLE 2

Staple fibre is impregnated at 20° with a 10% aqueous thiourea solution, squeezed out until the weight increase is 100% and then dried at 80–100°. The pretreated goods are printed with the following printing paste:

30 parts of the dyestuff of the formula

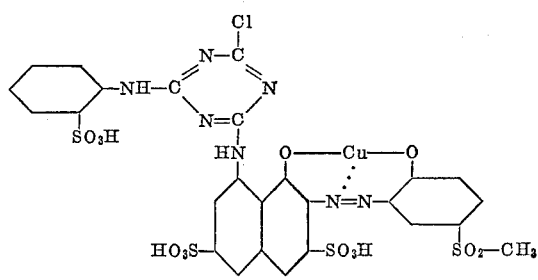

- 100 parts of urea
- 200 parts of water
- 10 parts of the sodium salt of 3-nitrobenzene sulphonic acid
- 630 parts of sodium alginate (5% aqueous solution)
- 30 parts of potassium carbonate
- 1000 parts printing paste The printed goods are dried and steamed for 7–10 minutes or subjected to a dry heat treatment at 150–180° for 4–6 minutes. The goods are then rinsed, first cold and then hot and finally soaped at the boil for 30 minutes with a solution of 2 parts of Marseilles soap in 1000 parts of water. A deep, level, violet print is obtained.

If the textile is printed under otherwise the same conditions but without the pretreatment, then a considerably weaker and uneven print is obtained.

An equally deep and level print is attained if the fabric is pretreated with urea, guanidine carbonate, acetamide or methyl urea instead of thiourea.

Deep, level prints are also obtained if, under otherwise the same conditions as in the above example, one of the dyestuffs given in the following table is used.

*Table 2*

| No. | Dyestuff | Shade on cellulose fibres |
|---|---|---|
| 1 | (structure) | Ruby. |
| 2 | (structure) | Violet. |
| 3 | (structure) | Reddish blue. |
| 4 | (structure) | Do. |
| 5 | (structure) | Greenish black. |

Table 2—Continued

| No. | Dyestuff | Shade on cellulose fibres |
|---|---|---|
| 6 | [structure: naphthalene with HO₃S, HO₃S, NO₂ groups, azo-linked to naphthalene with NH-C(chlorotriazine-NH₂) substituent, Co complex, subscript 2] | Reddish black. |

EXAMPLE 3

Cuprammonium rayon is treated in the foulard with an aqueous solution which contains 100 parts of guanidine carbonate per 1000 parts, squeezed out until the weight increase is 100% and dried at 80–100°. The pretreated fabric is then printed by one of the usual methods with the following printing colour:

- 30 parts of the dyestuff obtained by condensing 1 mol of copper phthalocyanine disulphonic acid disulphochloride with 2 mols of 4,4'-diaminodiphenyl-2,2'-disulphonic acid and then with 2 mols of β-chlorocrotonic acid chloride
- 100 parts of urea
- 200 parts of water
- 10 parts of the sodium salt of 3-nitrobenzene sulphonic acid
- 630 parts of sodium alginate (5% aqueous solution)
- 30 parts of sodium carbonate
- 1000 parts of printing colour The printed material is steamed for 7–10 minutes or subjected to a dry heat treatment at 150–180° for 4–6 minutes. The goods are rinsed first cold and then hot and then soaped at the boil for 30 minutes with a solution containing 2 parts of Marseilles soap per 1000 parts of water. A deep, level, turquoise blue print is obtained.

Under otherwise the same conditions but without pretreating the textile with guanidine carbonate, weaker and uneven prints are obtained.

A similar result is attained if the fabric is pretreated with urea, thiourea, acetamide or methyl urea instead of with guanidine carbonate.

If one of the dyestuffs given in the following table is used under otherwise the same conditions, then deep, level prints are also obtained.

Table 3

| No. | Dyestuff | Shade on cellulose fibres |
|---|---|---|
| 1 | Condensation product from 1 mol of copper phthalocyanine sulphonic acid trisulphochloride and 2 mols of ammonia, 1 mol of m-phenylenediamine sulphonic acid and the condensation product from 1 mol of cyanuric chloride and 1 mol of 2-aminobenzene-1-sulphonic acid. | Turquoise blue. |
| 2 | Condensation product from 1 mol of copper phthalocyanine disulphonic acid disulphochloride and 1 mol of ammonia, 1 mol of 2,4-diaminobenzene-1-sulphonic acid and 1 mol of 2,4,5,6-tetrachloropyrimidine. | Do. |
| 3 | [structure: anthraquinone with NH₂, SO₃H, HO₃S groups, NH-phenyl-SO₃H linked to NH-trichloropyrimidine] | Blue. |
| 4 | [structure: anthraquinone with NH₂, SO₃H groups, NH-phenyl-SO₃H linked to NH-C(dichlorotriazine)-NH-phenyl-SO₃H] | Do. |

Table 3—Continued

| No. | Dyestuff | Shade on cellulose fibres |
|---|---|---|
| 5 | 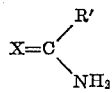 (anthraquinone dye structure with $HO_3S$, $NH_2$, $SO_3H$ groups linked via $NH$–cyclohexyl–$NH$– to a trichlorotriazine) | Blue. |

What we claim is:

A process for printing delustered regenerated cellulose material consisting essentially of
 (a) impregnating the said material with an aqueous solution of a compound of the formula $$X=C\begin{smallmatrix}R'\\NH_2\end{smallmatrix}$$

wherein
 X is a member selected from the group consisting of S, O and NH, and
 R' is a member selected from the group consisting of —$NH_2$, —$NHCH_3$ and —$CH_3$, with the limitation that when X is S or NH, R' must be —$NH_2$;
 (b) drying the material at an elevated temperature not exceeding 100° C.
 (c) printing the dried material with a printing paste containing as the essential ingredients a reactive dyestuff, urea, and an alkaline acid binding agent.

References Cited in the file of this patent
UNITED STATES PATENTS

| 2,278,285 | Reese | Mar. 31, 1948 |
| 2,574,806 | Wiazmitinow et al. | Nov. 13, 1951 |
| 2,928,712 | Bradshaw | Mar. 15, 1960 |
| 2,978,289 | Barker et al. | Apr. 4, 1961 |
| 2,995,412 | Kleb | Aug. 8, 1961 |
| 3,007,762 | Wegmann et al. | Nov. 7, 1961 |

FOREIGN PATENTS

| 665,660 | Great Britain | Jan. 30, 1952 |
| 743,307 | Germany | Dec. 12, 1943 |

OTHER REFERENCES

Mauersberger: Matthew's Textile Fibers, 5th edition, pages 48, 767 and 775, published, 1947, by J. Wiley & Sons, New York, N.Y., TS1540.